INVENTORS
SERGE A. LOUKOMSKY
EDWIN I. STEARNS
ATTORNEY

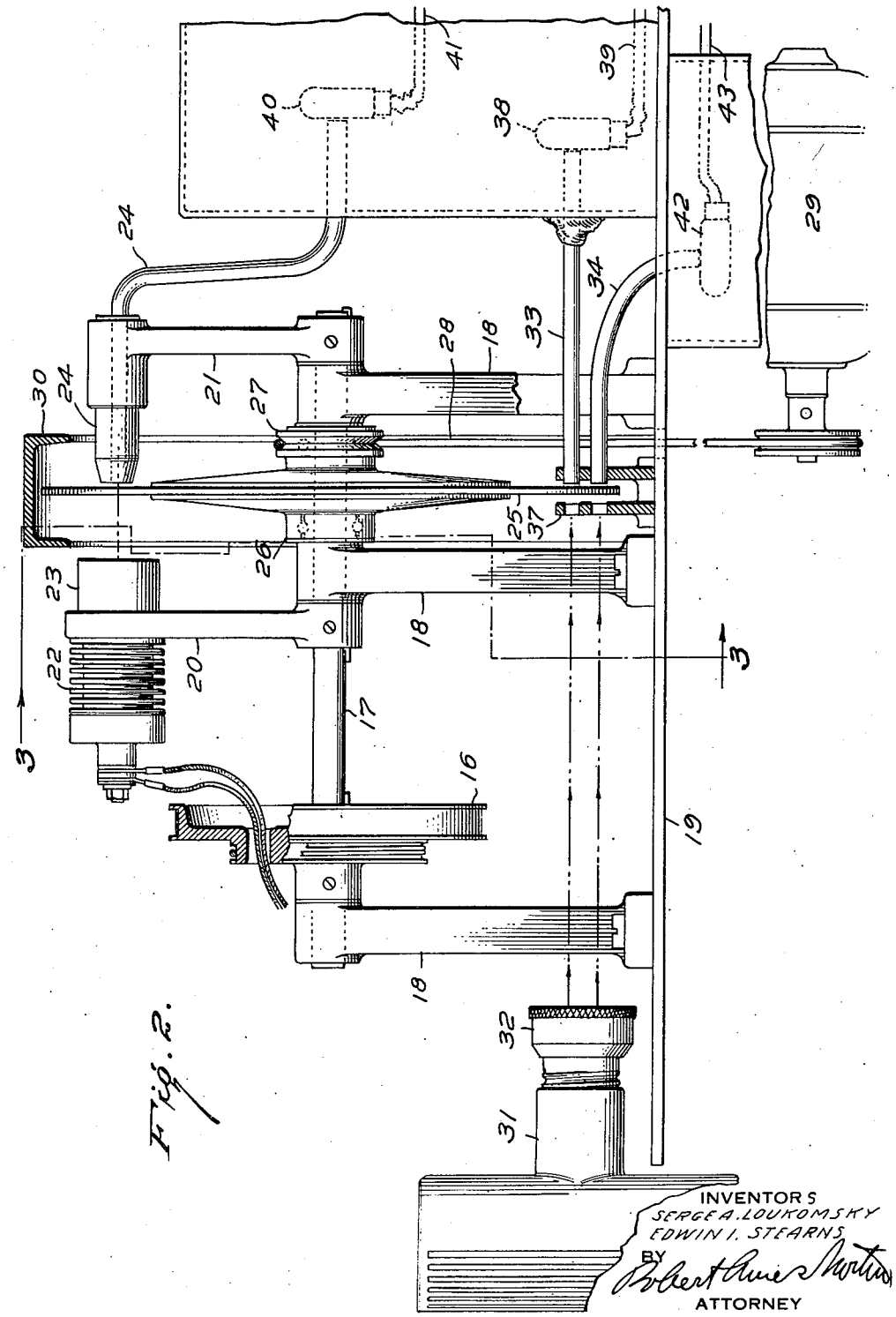

July 15, 1952 S. A. LOUKOMSKY ET AL 2,603,123
TRISTIMULUS INTEGRATOR
Filed March 4, 1950 6 Sheets-Sheet 3
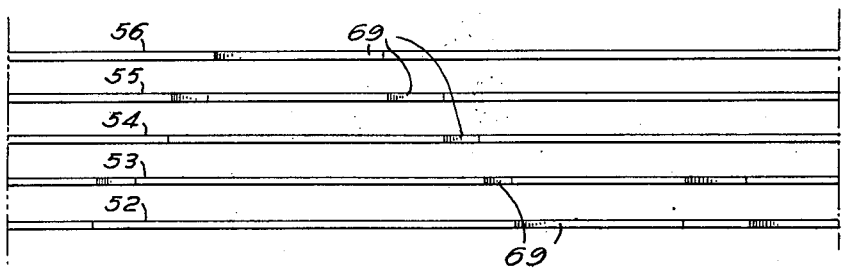
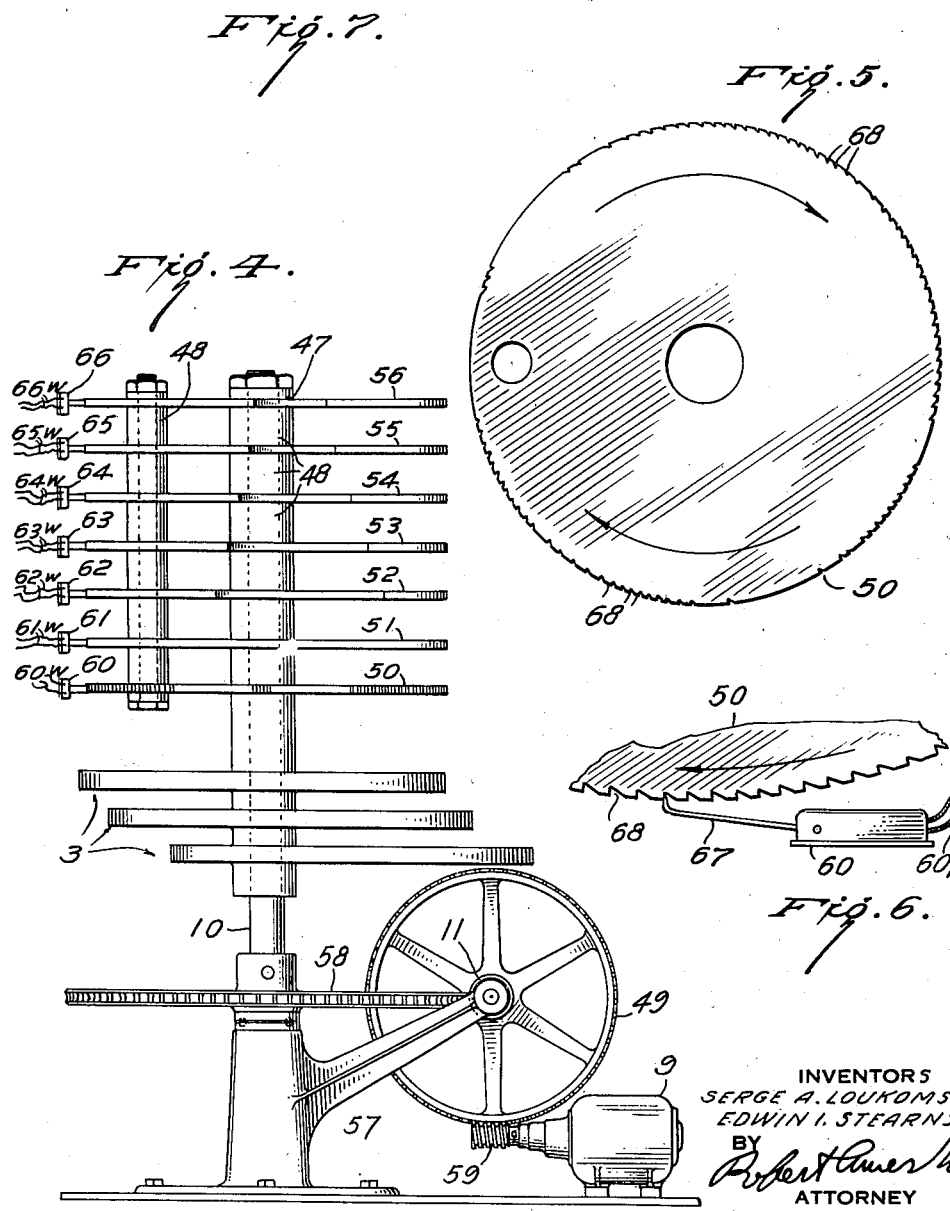
INVENTORS
SERGE A. LOUKOMSKY,
EDWIN I. STEARNS
BY
ATTORNEY July 15, 1952 S. A. LOUKOMSKY ET AL 2,603,123
TRISTIMULUS INTEGRATOR
Filed March 4, 1950 6 Sheets-Sheet 4

INVENTORS
SERGE A. LOUKOMSKY,
EDWIN I. STEARNS.
BY
Robert Ames Norton
ATTORNEY

July 15, 1952  S. A. LOUKOMSKY ET AL  2,603,123
TRISTIMULUS INTEGRATOR

Filed March 4, 1950  6 Sheets-Sheet 5

INVENTORS
SERGE A. LOUKOMSKY,
EDWIN I. STEARNS
BY Robert Ames Norton
ATTORNEY

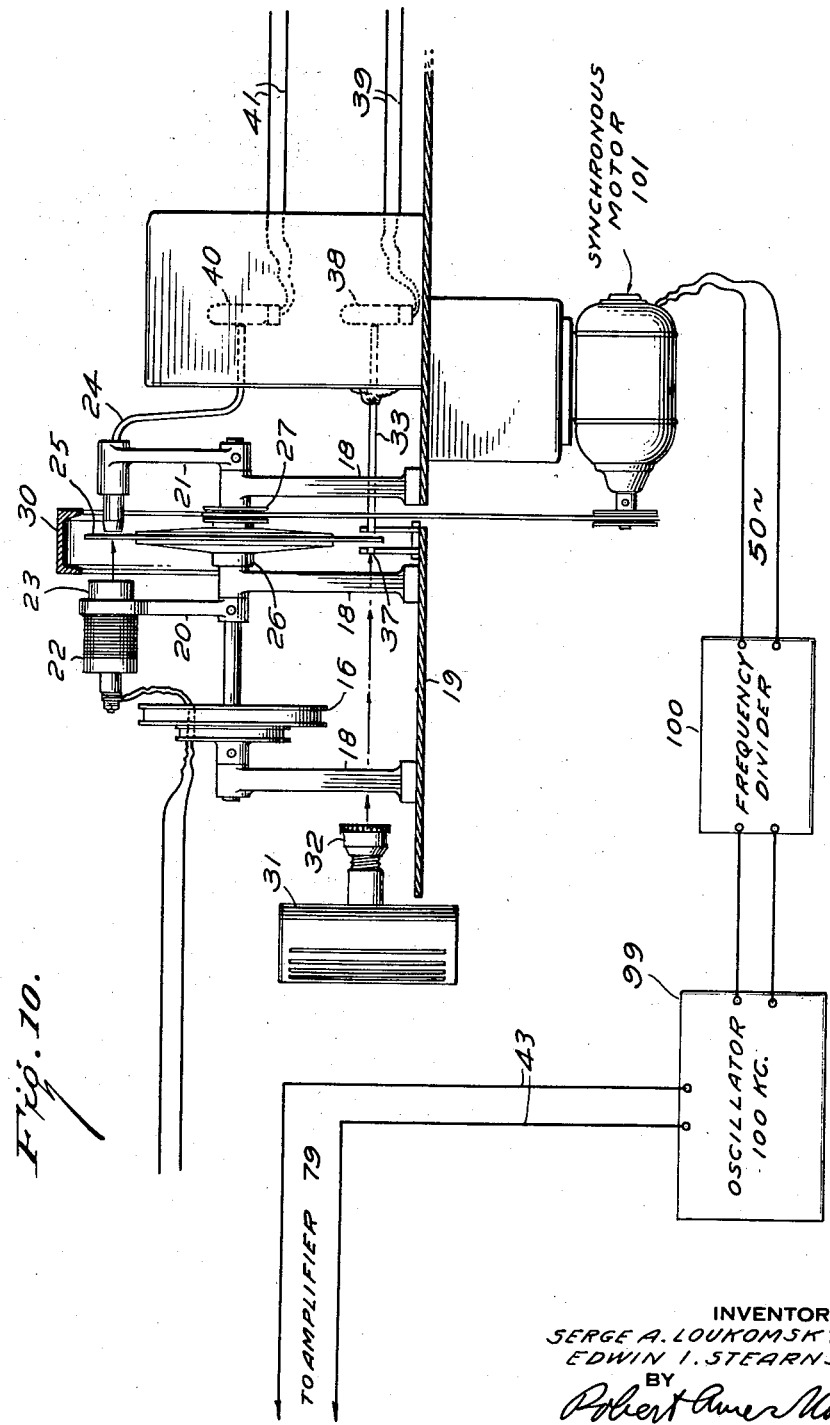

Patented July 15, 1952

2,603,123

UNITED STATES PATENT OFFICE 2,603,123

TRISTIMULUS INTEGRATOR

Serge A. Loukomsky and Edwin I. Stearns, North Plainfield, N. J., assignors to American Cyanamid Company, New York, N. Y., a corporation of Maine Application March 4, 1950, Serial No. 147,721

5 Claims. (Cl. 88—14)

This invention relates to a method and apparatus for tristimulus integration of colored samples.

It has long been accepted that the physiological effect of light of any color can be specified by three numbers which are the amounts of primaries required to produce a match. Similarly, the color of any transmitting or reflecting sample viewed under a specified illumination can be represented by three quantities each of which is the integral of the spectrophotometric reflectance or transmission of the color multiplied by each of the three tristimulus functions. There are an infinite number of possible sets of tristimulus functions, but ordinarily only those are chosen which are capable of representing all colors without negative quantities, and in which one of the functions, normally the $\overline{Y}$ function, corresponds to the spectral sensitivity of the human eye. The illuminant used is also a factor, and there are therefore normally a set of tristimulus functions for each standard illuminant, usually daylight and an accepted standard incandescent light.

It is quite possible to obtain quantities representing integrated tristimulus values for any color by mechanical integration of the output of a spectrophotometer multiplied at each wavelength by the value of each tristimulus function for the particular wavelength. Continuous mechanical integrators are known, a typical one being described in United States Patent 1,799,134. Mechanical integration, however, will not give a sufficiently accurate result with many colors because the integrator can not follow through the color range of spectrophotometric reflectance values with sufficiently great accuracy. Continuous integration by mechanical means, although theoretically ideal, has therefore been restricted in its use to conditions where the accuracy required is within its capabilities.

There are two other methods by which integrated tristimulus values of a color may be determined by using measurements of reflectance or transmission at a finite number of discontinuous wavelengths. In one system the wavelengths are uniformly or arbitrarily chosen and are weighted in accordance with the tristimulus functions. This method, while it permits, theoretically, a high degree of accuracy with a moderate number of ordinates, for example, 300 to 500 ordinates, is not practical because the weighting of each individual ordinate will be different and will represent normally a number involving a fraction which can not readily be adapted to the type of automatic integration which is a feature of this invention, and which will be described below.

Another method, using a certain number of ordinates, is to divide the area under the curves of each of the tristimulus functions into a large number of zones and select an ordinate in the center of each zone. If a very large number of ordinates, different for each tristimulus function, is used, the discontinuous integration will give an integrated tristimulus value of any desired degree of accuracy. However, a very large number of ordinates must be taken for maximum accuracy, and they must be placed very close to each other at points where the tristimulus function has high values. This integration can not be used practically because if manual addition is used the time taken is excessive.

The time factor can be enormously reduced by modern electronic digital counters, in which counting speeds in excess of 100,000/sec. are obtainable. The digital counters may be of the basic binary type, which is suited to the standard flip-flop tube circuits without change, or they may be the modern decade counters in which the circuits of the decades are modified to count in powers of ten.

In spite of the availability of electronic counters of high speed, the above method, which is called the "selected ordinate method," has never been used practically for automatic electronic integration. The first method, which is called the "weighted ordinate method" is, of course, not applicable to electronic counting systems because of the large number of fractional weighting numbers involved.

One of the reasons why it is not practical to use digital counters for integration by the selected ordinate method as that the ordinates at the points near the maxima of tristimulus functions are so close together that it is not mechanically practical to design a device which will produce electrical pulses proportional to the reflectance or transmission of a number of closely spaced selected ordinates.

The present invention has for its basic underlying concept the division of groups of selected ordinates into groups of varying spaces. It is then possible to use the center selected ordinate of such a group by giving it a suitable weighting factor. The most simple series of weights are powers of 2; that is to say, factors of 2, 4, 8, 16, etc. In this manner it is possible to reduce by a considerable factor the number of selected ordinates required to give a high degree of precision with a moderate number of ordinates. A minimum accuracy of the order of magnitude of 1 part in 5,000 can readily be obtained, which is adequate for all practical color measuring purposes, as it is equal to, or greater than, the accuracy of the human eye. Factorial weighting permits the use of an electronic counting circuit preceding the standard digital counter. When the preferred weighting in powers of 2 is used, the basic binary system of flip-flop tubes may be employed without any circuit modifications. This is preferred, although it is possible to operate with other factorial systems. The binary system, however, is so much more convenient that it is preferred in practice although the invention is not broadly limited thereto.

With 500 ordinates per tristimulus function, and with the extreme closeness of spacing in certain portions eliminated by the factorial weighting, it is possible to operate a spectrophotometer substantially at full speed with practical pulse-generating systems, of which a preferred type will be described below in more detail.

Qualitatively the operation of the method of the present invention may be described as follows:

The wavelength drive of a typical recording flickering beam spectrophotometer is provided with two devices, one of which operates a series of switches which cut in a pulse-generating system at the wavelengths corresponding to the selected ordinates, to which we refer as "count actuators"; the second device operating switches which cut in electronic gates so that the pulse-generator output is fed directly to the decade digital counter for ordinates of maximum weight and to the input circuits of the flip-flop tubes preceding the counter for various lesser weights, to which we will refer as "weight selectors." For example, if weights of 1, 2, 4, 8, 16 and 32 are to be used, five flip-flop tubes in cascade will precede the digital counter, and there will be six gating circuits operated by the second of the two devices connected to the wavelength drive. Ordinates bearing a weight of 32 will open the gate circuit from the pulse-generator directly to the digital counter. Weights of 16 will open the gate to the input circuit of the last flip-flop tube, etc. Weights of 1 will open the gate to the input circuit of the first flip-flop tube. The number of pulses generated at each ordinate should be proportional to the reflectance or transmission as measured by the spectrophotometer for that particular wavelength, and the pulse circuit is therefore controlled by means driven from the recording drive of the spectrophotometer.

A separate set of weight selectors and count actuators is required for each integration. An assembly may be constructed to obtain simultaneously as many integrated tristimulus values as desired, either one, three or six. In practical use, however, the increase in equipment cost is usually not justified; therefore, while multiple integrators are included in the broad scope of the present invention, the modifications with a single integrator and interchangeable switch operating devices for the different tristimuli is preferred.

The present invention, broadly, is not concerned with any particular design of pulse-generator. It is preferred to use a particular type of optical electrical pulse-generator which has proven to be economical and reliable. This particular type is not claimed as such in the present invention, except in conjunction with the other features of the process and apparatus, but forms the subject matter of the co-pending application of Loukomsky and Butler, Serial No. 147,722, filed March 4, 1950.

The accuracy of the device depends on the frequency of pulse generation, and the number of ordinates used. In the preferred device, which will be described below, 3,001 pulses for 100% reflectance or transmission of an ordinate have been found to be a convenient order of magnitude, and the following number of ordinates will give the desired accuracy for daylight and tungsten illumination with a maximum weighting factor of 16:

*Table I*

3001 SLITS—100% R

|   | Illuminant C (Daylight) | | Illuminant A (Tungsten) | |
|---|---|---|---|---|
|   | Unweighted Ordinates | Weighted Ordinates | Unweighted Ordinates | Weighted Ordinates |
| $\bar{X}$ | 522 | 87 | 586 | 90 |
| $\bar{Y}$ | 533 | 82 | 533 | 77 |
| $\bar{Z}$ | 630 | 75 | 379 | 1 80 |

1 Minimum weight $\frac{1}{32}$; all the rest, minimum weight $\frac{1}{16}$.

The constants of integration are determined in accordance with the areas under the tristimulus curves which, normalized so that $\bar{Y}=100{,}000$, are as follows:

|   | Illuminant C (Daylight) | Illuminant A (Tungsten) |
|---|---|---|
| $\bar{X}$ | 97.933 | 109.842 |
| $\bar{Y}$ | 100.000 | 100.000 |
| $\bar{Z}$ | 118.136 | 35.570 |

The invention will be described in greater detail in conjunction with the drawings, in which:

Fig. 2 is an enlarged vertical elevation of the pulse-generator, partly in section, along the line 2—2 of Fig. 1;

Fig. 4 is an enlarged detail elevation of the ordinate selecting and weighting means;

Fig. 5 is a plan view of the ordinate selecting cam;

Fig. 6 is an enlarged detail of a portion of the ordinate selecting cam and corresponding microswitch;

Fig. 7 is a developed surface of the edges of five of the weighting cams;

Fig. 10 is a diagrammatic representation of a modified pulse generator in which the pulses are generated electronically.

Fig. 1 illustrates the application of the preferred form of pulse-generator and integrator to a standard type of recording flickering beam spectrophotometer as described in the Pineo Patent 2,107,836. Since the spectrophotometer is of conventional design, only the portions directly cooperating with the pulse generator weighting and integrating means are shown in detail.

Figure 1:
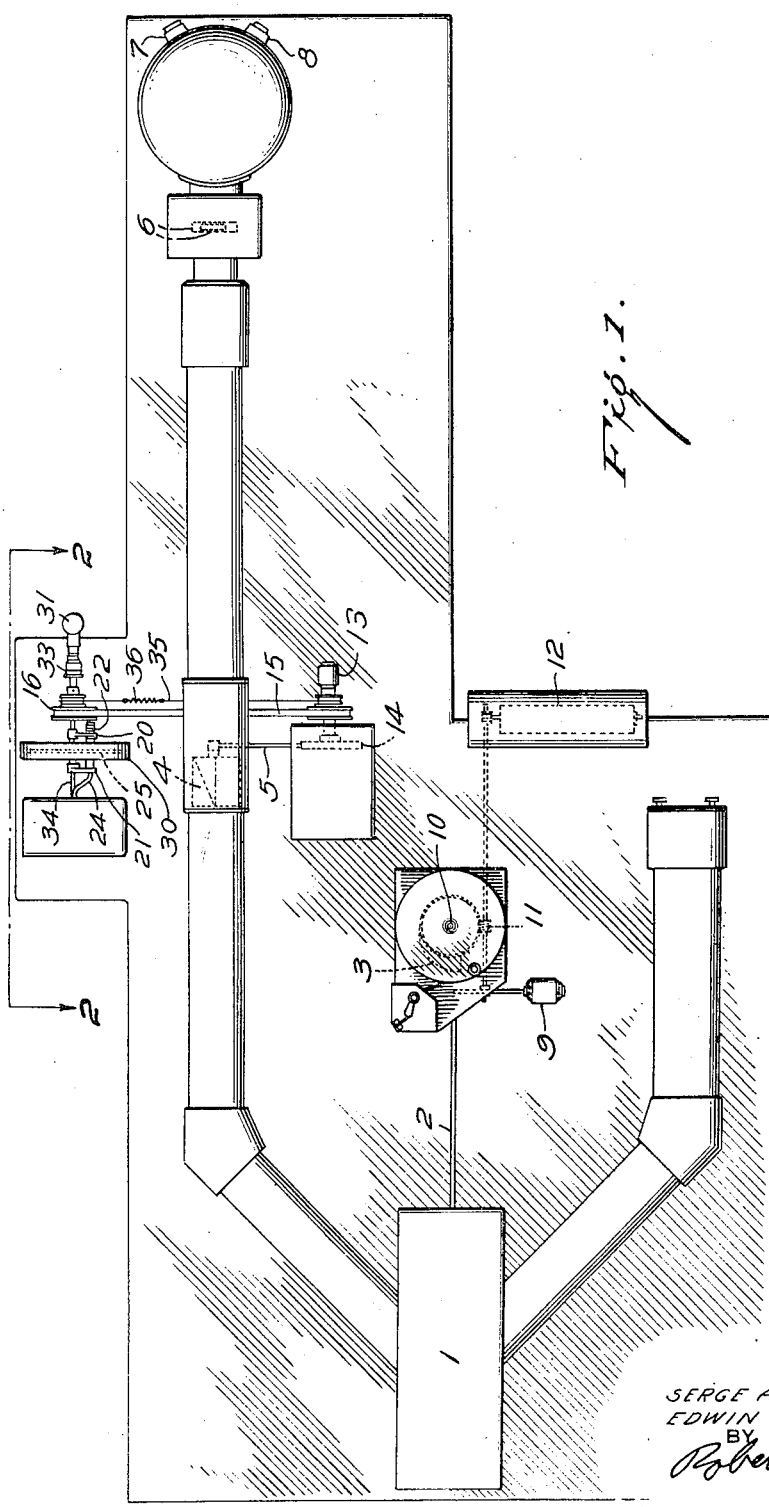
Fig. 1 is a semi-diagrammatic plan view of a flickering beam spectrophotometer, pulse generator and weighting system.

The conventional Van Cittert double monochromator of the spectrophotometer is shown at 1. The monochromator is operated in the usual manner by the wavelength-changing rod 2 engaging with one of the wavelength cams 3 on the shaft 10 driven by the motor 9 through gearing, which will be described below in connection with Fig. 4, and the worm 11. This same drive actuates the conventional recording drum 12 of the spectrophotometer.

The spectrophotomer operates in its customary manner, the monochromatic light from the monochromator passing through a photometering Rochon or Nicol prism 4, rotatable by the cam follower 5, which contacts a linear record cam 14. This cam provides shaft rotation proportional to the square of the tangent of the angle through which the photometering prism 4 is turned. The polarized beam is then split into two by the conventional Wollaston prisms, the two beams flickered in opposite phase in the usual manner, and passed through transmission sample holders 6 into an integrating sphere provided with reflectance sample holders 7 and 8. Unbalance of light in the integrating sphere at flicker frequency, due to differential transmission or reflectance of sample and standard, is then amplified in the usual manner by a high-gain flicker frequency amplifier (not shown), and actuates the photometering motor 13 to turn it in a direction to rotate cam 14, through high-reduction friction transmission, to rotate the photometering prism 4 so as to restore the total light in the integrating sphere to balance.

A steel tape on a pulley on the shaft of the cam 14 drives a corresponding pulley 16 in the pulse-generator, the steel tape being kept taut at all times by the cable 35 and tightening spring 36. As a result the pulley 16 is rotated in proportion to changes in the percentage transmission or reflectance of the sample whose integrated tristimulus values are to be evaluated.

Figure 3:
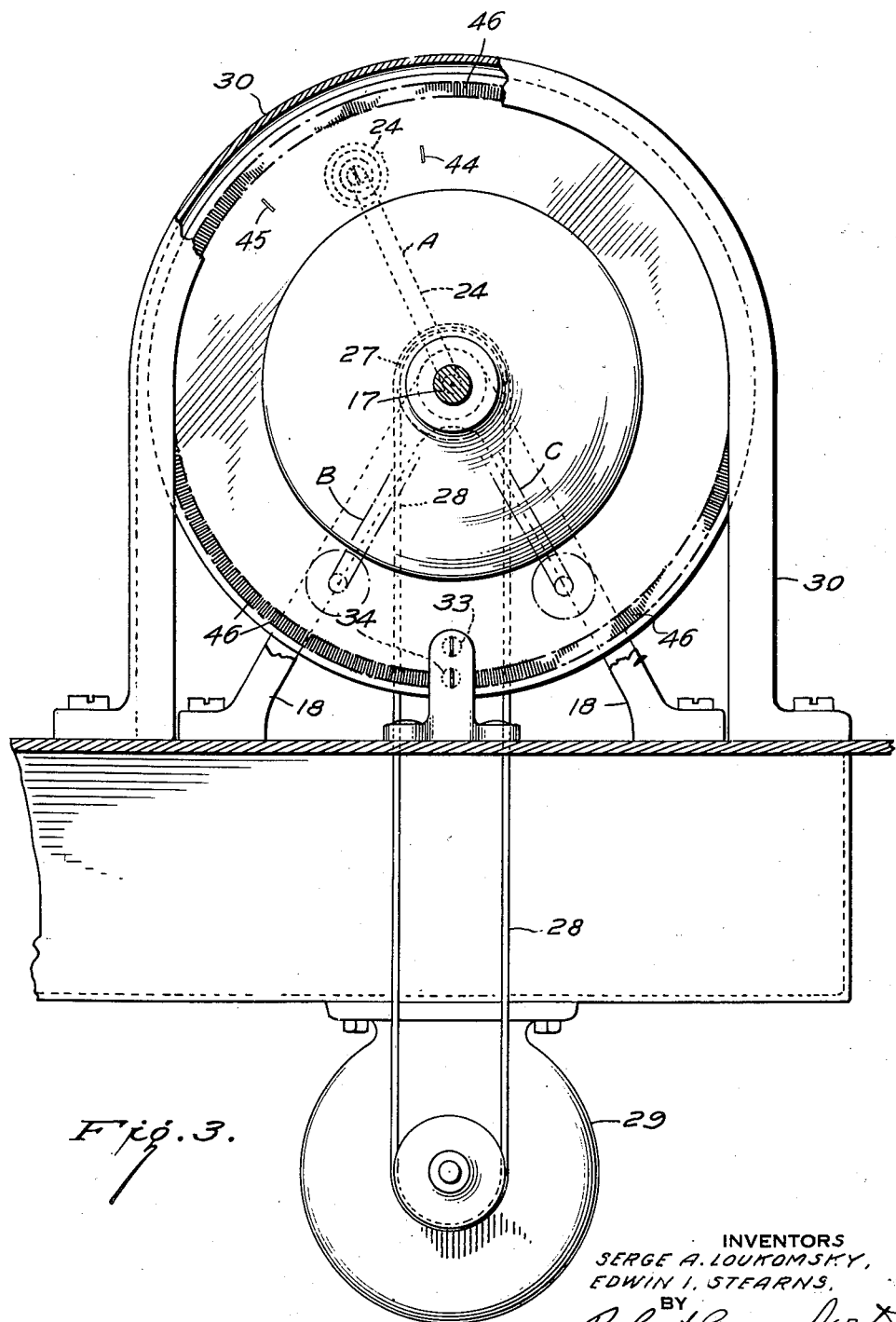
Fig. 3 is an enlarged end view, partly broken away, of the pulse-generator.

The preferred pulse-generator of the present invention is a combined optical and electrical device, the optical portion being illustrated in enlarged detail in Figs. 2 and 3.

The pulley 16 is keyed onto a shaft 17 journaled in three supporting columns 18 on a framework 19. On this shaft there are keyed two parallel arms 20 and 21. The first carries a light source 22 and collimating lens 23; and the second a slot and a bent rod 24 of transparent methylmethacrylate resin. The rod enters the light-tight housing of the electrical portion of the device through a hole concentric with the shaft 17 and serves to lead light into said housing.

A second light source 31, with collimating lens 32, directs a parallel beam through two openings in one leg of a mask 37. In the corresponding opening in the other leg are two slots mounted on transparent methylmethacrylate plastic rods 33 and 34 also entering the housing of the electrical portion of the device. The three rods 24, 33, and 34 lead the light beams striking their faces to three phototubes 40, 38 and 42 respectively, from which output wires 41, 39 and 43 lead into the electronic portion of the device, which will be described below.

Between the right-hand supports 18 there is mounted on the shaft 17, in ball bearings, a hub 26 carrying a glass disc 25 which is rotated at a high, but not necessarily synchronous, speed of approximately 2700 R. P. M. The drive is through the pulley 27 and belt 28. A housing 30 surrounds the upper edge of the rotating disc.

The disc, which is cut from a photographic negative plate, is provided with a series of narrow, clear portions, or slots 46 (Fig. 3), around its periphery. These slots, which are uniformly spaced, number 3600. Just inside the row of slots there is a single slot 45 which will be referred to as the stopping slot, and still nearer the center, a starting slot 44, displaced from the stopping slot by a predetermined angle, in the device illustrated, 30°. The rest of the disc is opaque, and its rotation is counter-clockwise.

The arm 21 is shown in three positions, A, B, and C, the first corresponding to a position for which the operation of the device will be described below, while B and C show the arm in the two extreme positions corresponding to zero transmission or reflectance of the spectrophotometer, or 100% respectively. In positions B and C the arm 21 is exactly 30° from the openings in the mask 37.

Flashes of light through the starting slot 44 start the electronic counting circuits as will be described below, and, as its name indicates, a flash of light through the stopping slot 45 stops counting. In the position A it will be seen that the starting slot 44 is almost opposite the end of the rod 24. As it passes, a pulse of light through the rod 24 is transformed into an electrical pulse by the phototube 40 and starts the counting circuits as will be described later. Then each flash through the rod 34, as the slots 46 pass in front of it, is transformed into an electrical pulse by the phototube 42 and is counted. When the stopping slot 45 passes in front of the rod 33, the resulting flash is transformed into an electrical pulse by the phototube 38 and stops the counting circuits.

It will be noted that the number of flashes from the slots 46 which are counted, is proportional to the angular position of the rod 24, that is to say, to the percentage transmission or reflectance measured by the spectrophotometer at a particular wavelength.

In the position B the starting flash and the stopping flash occur one right before the other. Zero reflectance or transmission is therefore represented by a single counted flash. In position C, corresponding to 100% reflectance or transmission, there will be 3.001 flashes counted.

In order to operate the machine, it is necessary that the ordinates be selected and that the proper weighting be given to each ordinate. This is effected by a splined, detachable sleeve 47 which slides down on the shaft 10 (see Fig. 4), the shaft being journaled in the mounting 57. The drive is by motor 9 through worm 59, worm wheel 49, worm 11 and worm wheel 58. The reduction is such that the shaft 10 makes somewhat less than a complete revolution in two minutes, which is the standard operating cycle of the spectrophotometer. The wavelength cams 3 determine the range of the spectrum through which the monochromator moves, and, for clarity, in Fig. 4 the rod 2, moved by the cams 3, is omitted.

The sleeve 47 carries seven cam discs 50 to 56, spacing being maintained by the spacers 48, which serve to make the whole assembly rigid. Engaging with the edges of each of the cam discs, are corresponding microswitches 60 to 66. From each switch emerges a pair of wires which will be designated for clarity by the number of the switch with the subscript "w." In other words, the wires from switch 60 will be designated $60_w$.

Disc 50 is the ordinate-selecting disc, and is provided with a series of notches 68 distributed non-uniformly around its periphery at the angular positions corresponding to the position of the shaft 10 at different wavelengths of the selected ordinates.

The microswitch 60 engaging the periphery of the disc 50 is provided with an actuating arm 67 (Fig. 6). This is a conventional design of microswitch and hence the actuating arms of the other microswitches 61 to 66, which are shown on Fig. 4, carry no reference numerals. They are of similar shape to 67.

When the arm 67 of the switch 60 drops into an ordinate-selecting notch 68, a circuit is closed through the wires 60w, which activates the electronic circuits of the counter and weighter so that they can respond to pulses from the starting, counting, and stopping slots only once for each closing of switch 60. This is necessary as the disc 25 makes more than one revolution between notches, and may make more than one revolution while switch 60 is closed.

Discs 51 to 56 correspond approximately to tristimulus $\overline{X}$ for daylight (Illuminant C). Since a maximum weighting ratio of 1:16 suffices for this tristimulus, disc 51, which corresponds to a weighting of 1, does not have any indentations and therefore its microswitch is not actuated when the integral value of this tristimulus is being measured. The smallest weighting, a weighting of 2, is provided by disc 52 and as disc 56, provides for a weighting of 32, the ratio 16:1 is maintained.

Fig. 7 shows the peripheral surfaces of discs 52 to 56 rolled out in a straight line. Disc 51 is not shown as it has a smooth surface. It will be noted that the indentations 69 give various weights for different groups of selected ordinates, disc 51 corresponding to a weighting of 1, 52 to 2, 53 to 4, etc. It will also be noted that the areas in the spectrum where the same weighting is employed, correspond roughly to the curve of the tristimulus function, the surface reading increasing in frequency from left to right because of the direction of rotation of the discs, which is the opposite of the conventional representation of spectral curves.

Figure 8:
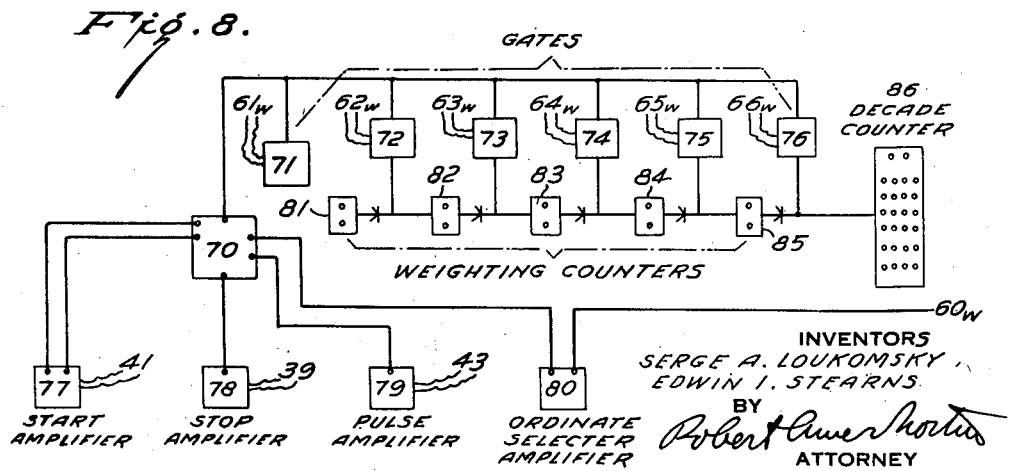
Fig. 8 is a diagrammatic representation of the electronic circuits of the pulse-generator, weighting and counting devices.

The operation of the electrical pulse-generator weighting and counting circuits will be described in connection with Fig. 8, which is a block diagram, as the electronic circuits consist of known elements. Pulses from the starting thermotube 40 are carried through wires 41 to a pulse amplifier and shaper 77 of conventional design. In a similar manner, the stop pulses from phototube 38 are carried through wires 39 to the pulse shaper and an amplifier 78, and the pulses from the counting phototube 42 through wires 43 to the amplifier 79. A gating circuit 70 has a circuit activating the gate, which circuit is actuated through wires 60w and amplifier 80. The output of the amplifier 77 is then able to open the gating circuit so that the pulses from amplifier 79 pass through. The circuit is inactivated by a pulse from amplifier 78, which re-sets it so that it is necessary for it to receive first a pulse through wires 60w, and then from the amplifier 77, before it again opens. The counting pulses pass to the gating circuits 71 to 76, which are actuated by the closing of microswitches 61 to 66, respectively. These gating circuits lead into the inputs of binary flip-flop tube circuits 81 to 85, serving as weighting counters, and direct to the input of the six-decade digital counter 86 respectively. When microswitch 61 is closed, the pulses passing through the gating circuit 70 are impressed on the input circuit of the first flop-flop tube circuit 81. They are counted through the five flop-flop circuits, and then into the digital counter. In other words, there is a pulse in the input of the digital counter for every thirty-two pulses in the input circuit of the first flop-flop circuit 81. If a different weight is called for for a particular ordinate, for example a weight of eight, a depression in the disc 54 engages with the actuating arm 64, and the counting pulses are then applied directly to the input circuit of flop-flop tube 84. In this case there will be a pulse in the input of the digital counter for every four pulses. Where a weighting ratio of 32:1 is required, as in the case of the $\overline{Z}$ tristimulus for illuminant A, there will be a depression on the disc 51, which will actuate the microswitch 66 and the gating circuit 71 so that the counting pulses will be applied to the first weighting counter 84.

The operation of the gating circuit 70 will be described in connection with Fig. 9 which is a schematic diagram of the essential elements thereof. The gating circuit consists of two pairs of flip-flop tubes 87 an 88, and 89 and 90. The flip-flop tubes are connected to a source of B+ voltage in the usual manner through plate resistors 91–94, the last one being tapped and connected to the cathode of a diode 95. The plate ends of the resistors 91–94 are connected in the usual manner to the grids of the opposite tube of each pair through the conventional RC circuits. The grids are provided with grid resistors, and the cathodes of each pair are connected to ground through the usual by-passed resistors. One of the wires 60w from the output of a trigger actuated by the ordinate selector is connected to the plate end of the resistor 91, and the outputs of the start and stop amplifiers 77 and 78 are connected respectively to the plate ends of the resistors 93 and 94. The latter point is also connected through two resistors in series to a source of 20–30 volts negative bias. The junction point of the two resistors is connected to the grid of tube 96, which furnishes voltage for a gating circuit connecting the pulse amplifier 79 to the weighting-gating circuits 71 to 76. The plate end of resistor 92 is connected to the plate of the diode 95 and through two resistors in series to the negative 30-volt biasing voltage source. The junction of the two resistors is connected to the grid of a cathode follower tube 97, the cathode of which is connected to the cathode of a diode 98, the plate of which is connected to the grid of the last stage of amplifier 77.

All pulses actuating the gating circuits are negative pulses. In its normal condition, triodes 88 and 90 are conducting, and triodes 87 and 89 are biased to cut-off. In this condition the voltage at the plate end of resistor 92 is low and, accordingly, triode 97 is not conducting, and therefore its cathode, and hence the cathode of diode 98, is at ground potential. This diode effectively short-circuits the signal to the last stage of amplifier 77, and no start pulses are present in the output of this amplifier. Also, cathode follower 96 is at cut-off and no positive gating voltage is available.

When the microswitch 60 drops into a notch on the disc 50, a negative pulse is applied by the amplifier 80 to the plate end of resistor 91 and through the RC circuit to the grid of tube 88. The latter is flipped to the non-conducting position, and the resulting high voltage from the plate end of resistor 92 starts the tube 87 conducting, the resultant low voltage at the plate end of the resistor 91 maintaining the grid of tube 88 biased to cut-off. The high voltage from the plate end of resistor 92 overcomes the bias on the tube 97, which starts to conduct, raising the voltage of the cathode of the tube 98 so that the latter ceases conducting, and the output stage of amplifier 77 is therefore no longer short-circuited. The diode 95 begins to conduct since its anode is at higher potential than the cathode but the positive pulse applied to the tap of resistor 94 is insufficient to start tube 89 conducting. The tubes 89 and 90 are now set for response to starting and stopping pulses. When the starting slot in the disc registers with the starting beam, a negative pulse is delivered to the plate end of resistor 93 and thence to the grid of the tube 90. The latter flips to the non-conducting position, tube 89 conducting. The plate end of resistor 94 is now at high potential which overcomes the cut-off bias on tube 96, a corresponding positive voltage being impressed from its cathode to the gate circuit for the pulse amplifier 79, unlocking the latter in the conventional manner and permitting pulses from the amplifier 79 to reach the gating circuits 71–76, one of them being energized by the weight selector cams 51–56 so that the gate for the proper weighting is opened. Pulses from amplifier 79 are counted by the digital counter through the weighting circuit chosen. Diode 95 stops conducting when tube 90 becomes non-conducting, resulting in a positive pulse at the plate end of resistor 92, which also acts on the grid of the conducting tube 87 and hence does not flop the pair 87, 88.

When the stop slot in the disc registers with the stopping beam, a negative pulse is applied from the amplifier 78 to the plate end of resistor 94 and thence to the grid of tube 89. The tubes then flop back to their original state with the tube 90 conducting and tube 89 biased to cut-off. The lower voltage in resistor 94 permits the diode 95 to conduct, thus applying a negative pulse to the grid of the tube 87, causing this pair of tubes to flop to the original position; at the same time, tube 97 is biased to cut-off, diode 98 begins to conduct, and the starting amplifier 77 is short-circuited. The low voltage at the plate end of resistor 94 also results in biasing the tube 96 to cut-off, which closes the gate to the weighting and counting circuit. Succeeding stop pulses have no effect on the system because the tubes 89 and 90 are already in the flopped position, which results from a stop pulse.

It will be apparent that every ordinate on the disc 50 corresponds to a particular position in the spectrum. The transmission or reflectance measured by the spectrophotometer will determine the angular position of the rod 24 and hence the number of light pulses impressed on the phototube 42 between start and stop. At the same time, one of the weighting discs, through its microswitch, will connect the pulses to the proper portion of the weighting circuit so that the number of pulses will be given the proper weight. For the usual two-minute cycle of the spectrophotometer, the number of pulses counted are well within the 135 kc. response of the digital counter and weighting circuits, and at the end of the cycle the decade counter will give a number corresponding to the integrated tristimulus value of the particular tristimulus for a particular illuminant. Another set of discs for the next tristimulus are then slipped onto the shaft 10, and the operation repeated until the integrated values for all three tristimuli are obtained. If it is desired to obtain the integrated tristimulus values for another illuminant, the cycle is repeated three times with sets of discs for the tristimuli for the second illuminant.

It will be noted that the spectrophotometer operates in its normal manner and it is not necessary to provide a new instrument for the sole purpose of making tristumulus measurements. This is of practical advantage, making duplication of expensive equipment unnecessary.

Fig. 10 illustrates a modified pulse generator in which the pulses are generated electronically. Elements common to the other figures are given the same reference numerals. The disc 25 is provided only with starting and stopping slots 44 and 45, and only the light beams and photoelectric elements operating with the starting and stopping slots are included. Pulses are generated by the crystal-controlled oscillator 99, of conventional design, which may, for example, operate at 100 kc. These pulses are fed to the pulse amplifier 79. The sine wave of the oscillator is shaped by the amplifier. A pulse of 100 kc. signal is fed through a frequency divider 100, producing a submultiple frequency of 50 cycles, which operates the two-phase synchronous motor 101 to drive the disc at about 1800 R. P. M. in constant proportion to the oscillator frequency. The frequency divider includes conventional amplifier and phase-splitting circuits to produce a two-phase output of sufficient power to operate motor 101.

The operation of the device is exactly the same as the preferred modification shown in the preceding figures. Here, as there, the number of pulses is determined solely by the angular displacement of one of the light sources and its associated photoelectric device, in the figure the starting light source 22 and the bent rod 24 carrying a slot at its end. The number of pulses for a maximum displacement is still 3,001, and the accuracy of the device is in no way dependent upon an absolutely unchanging oscillator frequency. Even if this frequency changes slightly, for example by temperature changes which affect the crystal frequency, there is no change in precision for the frequency divider always causes the disc to rotate at a speed proportional to the oscillator frequency. As the latter increases, the speed of rotation increases in proportion and vice versa.

In the preferred modification, the pulse frequency is always the same constant multiple of disc R. P. M., and the ratio can not be changed because it is inherent in the structure of the disc. In the case of the modified pulse generator illustrated in Fig. 10, however, the relation between frequency and disc R. P. M. can be varied. For example, conventional switching in the frequency divider can change the frequency supplied to the motor 101. For any given setting of the switch, however, the ratio is constant.

Frequency dividers often divide the frequency factorially, for example in powers of 2, and it is possible in such cases to use the frequency divider for factorial weighting in which case the weighting selector cams will actuate switching in the frequency divider instead of using separate factorial weighting circuits. The modification of Fig. 10, therefore, permits a choice of the type weighting circuits used.

Because of its ruggedness and reliability, the pulse generator described in Figs. 1–7 is preferred even though the generator of Fig. 10 provides additional flexibility. The two pulse generators are illustrations of typical desirable modifications. However, any other pulse-generating device, the number of pulses of which can be controlled by the transmission or reflectance reading of the spectrophotometer, may be used.

It is an advantage of the combined system of the present invention that standard pulse amplifiers and shapers, binary flip-flop circuits, and digital counters may be used. It is also an advantage that these circuits, and particularly the decade counter, need not be permanently connected to the spectrophotometer, because the operation of the present invention does not involve any modification of the input circuit of the counter. It is thus possible in the preferred modification, using a standard counter, to make it detachable so that when the spectrophotometer is not being used for producing integrated tristimulus values, the counter can be employed for other purposes. Thus, while it is possible to build in a single permanent unit, counter and weighting circuits, it is advantageous to employ standard units with the additional flexibility of operation made possible thereby.

The invention has been illustrated in conjunction with a typical polarized light flickering beam spectrophotometer. This type of instrument, which is standard for high precision spectrophotometering, presents many practical advantages. However, it is by no means necessary to use a spectrophotometer of this type. Any spectrophotometer capable of actuating pulse generators and weighting circuits may be employed. Thus, it is possible to use the principles of the present invention for obtaining integrated values of other functions in portions of the spectrum outside the visible, for example in infrared and ultraviolet. The utility of the device of the present invention for producing integrated tristimulus values of colored objects or substances represents the field of greatest immediate practical importance, and this therefore constitutes the preferred embodiment of the invention.

For the measurement of integrated tristimulus values, and for most other purposes, the pulse-generator is controlled in proportion to reflectance or transmission. It should be understood, however, that other functions of wavelength, such as density and the like, may be used to control the number of pulses generated. They are contemplated in the broad aspects of the present invention, but as they are of minor practical value at the present time, they are not a preferred modification.

Figure 9:
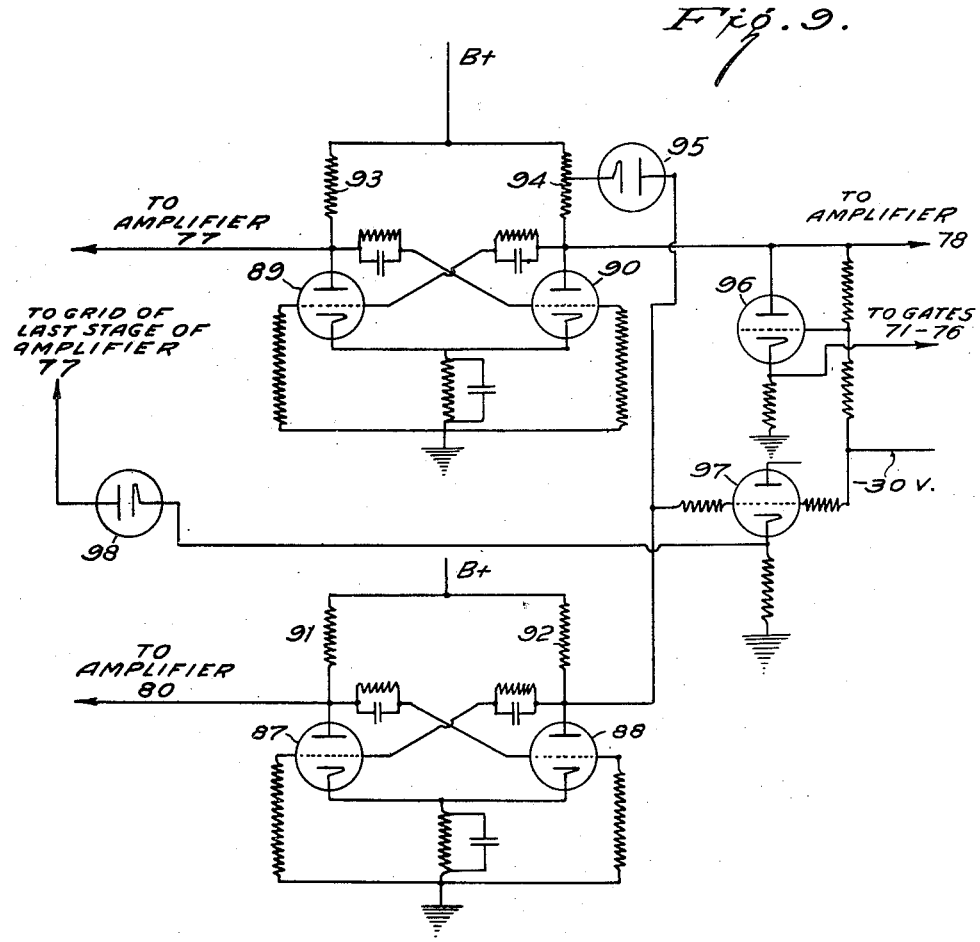
Fig. 9 is a schematic diagram of the gating circuit.

In the specification reference is frequently made to "gating circuits." It will be noted that these gating circuits do not necessarily all operate by the same electronic principle, and this is well illustrated by Fig. 9. Most of the gating is effected by the very common method of biasing a tube in a circuit to cut-off. There are, however, other well-known methods of negativing a circuit, one of which is illustrated by the diode 98 which absorbs the signal in a stage of the amplifier to which it belongs thus effectively short-circuiting the stage for certain types of signals. It should therefore be understood that in referring to gating circuits in the specification and claims it is not intended to limit them to those in which circuits are activated and inactivated by grid bias changes.

We claim:

1. A device for producing integrated values of spectrophotometric functions by a method of selected ordinates, which comprises an automatic spectrophotometer including a wave length drive, a digital counting circuit, an electric pulse generator, factorial weighting circuits selectively connecting the output of said generator to the digital counter whereby the number of pulses reaching the counter are varied by various factors, means actuated by the spectrophotometer for automatically applying a number of pulses from the pulse-generator to the connecting circuits proportional to a function of reflectance or transmittance at a series of preselected wave lengths in the spectrum covered by the spectrophotometer, and means actuated by the wave length drive of the spectrophotometer for applying the output of the pulse generator to a predetermined point in the factorial weighting circuit.

2. A device according to claim 1 for measuring integrated tristimulus values in which the pulse-generator output is controlled in proportion to percentage transmittance or reflectance and the weighting circuit and ordinate selection is in accordance with a tristimulus function for a selected illuminant.

3. A device according to claim 1 in which the spectrophotometer is of the polarized light flickering beam type comprising a monochromator, a wave length drive for said monochromator, an exit slit in said monochromator defining a monochromatic beam and in optical alignment therewith rotatable photometering means, means for splitting the plane polarized beam into two beams plane polarized at right angles to each other, flickering means in said two beams for causing the beams to vary in intensity from maximum to minimum in opposite phase, sample and standard holding means in said beams, a light integrator receiving light from both beams, means for transference of said fluctuations in integrated light into electric currents, a high gain flicker frequency amplifier and driving means for said photometering means actuated by output of the flicker frequency amplifier and phased to rotate the photometering means in a direction to bring about equality of light intensity of the two beams in the light integrating means, the photometering element drive actuating the means for applying the number of pulses from the pulse generator to the connecting circuits.

4. A device according to claim 1 in which there are provided gating circuits between the pulse-generator and the digital counter and means are provided, driven by the spectrophotometer wave length drive, to open said gating circuits at preselected wave lengths through proper channels in the weighting circuit, and means, driven from the spectrophotometer photometering drive, to vary the number of pulses which pass through the gating circuit.

5. A device according to claim 4 in which the gating circuit actuating means and the weighting circuit input selecting means are notched cams actuating microswitches connecting parts of the gating circuits.

SERGE A. LOUKOMSKY.
EDWIN I. STEARNS.

REFERENCES CITED

The following references are of record in the file of this patent:

UNITED STATES PATENTS

| Number | Name | Date |
|---|---|---|
| 1,799,134 | Hardy | Mar. 31, 1941 |
| 2,436,104 | Fisher et al. | Feb. 17, 1948 |
| 2,446,874 | Geffner | Aug. 10, 1948 |